US011214162B2

United States Patent
Liu et al.

(10) Patent No.: US 11,214,162 B2
(45) Date of Patent: Jan. 4, 2022

(54) CHARGING MODULE AND ROBOT HAVING THE SAME

(71) Applicant: UBTECH ROBOTICS CORP LTD, Shenzhen (CN)

(72) Inventors: Defu Liu, Shenzhen (CN); Wenhua Yu, Shenzhen (CN); Huai Peng, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 27 days.

(21) Appl. No.: 16/870,902

(22) Filed: May 9, 2020

(65) Prior Publication Data

US 2021/0146793 A1    May 20, 2021

(30) Foreign Application Priority Data

Nov. 15, 2019 (CN) .......................... 201911116936.X

(51) Int. Cl.
  *B60L 53/36*  (2019.01)
  *B60L 53/16*  (2019.01)
  *H01R 13/631* (2006.01)
  *H02J 7/00*   (2006.01)

(52) U.S. Cl.
  CPC .............. *B60L 53/36* (2019.02); *B60L 53/16* (2019.02); *H01R 13/631* (2013.01); *H02J 7/0045* (2013.01)

(58) Field of Classification Search
  CPC ....... B60L 53/36; B60L 53/16; H01R 13/631; H02J 7/0045

USPC ......................................................... 320/109
  See application file for complete search history.

(56) References Cited

U.S. PATENT DOCUMENTS

| 9,840,154 | B2 * | 12/2017 | Kwa .................... H02J 7/0044 |
| 2007/0216347 | A1 * | 9/2007 | Kaneko ............... G05D 1/0225 320/107 |
| 2009/0121673 | A1 * | 5/2009 | Nakayama ............ B25J 19/005 320/107 |
| 2010/0324736 | A1 * | 12/2010 | Yoo ...................... G05D 1/0234 700/259 |
| 2011/0236026 | A1 * | 9/2011 | Yoo ...................... G05D 1/0234 398/131 |
| 2019/0155295 | A1 * | 5/2019 | Moore ................. G05D 1/0236 |
| 2019/0372364 | A1 * | 12/2019 | Brady .................. H02J 7/0027 |
| 2020/0164760 | A1 * | 5/2020 | Sohmshetty ............ B64F 5/40 |
| 2020/0225673 | A1 * | 7/2020 | Ebrahimi Afrouzi ........ G05D 1/0214 |
| 2020/0235522 | A1 * | 7/2020 | Lv .......................... H02J 50/90 |
| 2020/0376973 | A1 * | 12/2020 | Traverso ................ B60L 53/35 |
| 2021/0030228 | A1 * | 2/2021 | Jang ........................ A47L 9/009 |

(Continued)

FOREIGN PATENT DOCUMENTS

| CN | 204668542 U | 9/2015 |
| CN | 106329657 A | 1/2017 |
| CN | 108832397 A | 11/2018 |

*Primary Examiner* — Suresh Memula

(57) ABSTRACT

A charging module for use with a charging station that includes a first connector, includes a housing, a second connector, and a guide structure configured to guide the first connector in a vertical direction. The guide structure includes a guiding member fixed to the second connector, or a guiding mechanism that elastically connects the second connector to the housing and allows the second connector to move with respect to the housing in the vertical direction.

15 Claims, 7 Drawing Sheets

(56) References Cited

U.S. PATENT DOCUMENTS

2021/0031947 A1* 2/2021 Wankewycz ........... B64D 27/24
2021/0037703 A1* 2/2021 Holgersson .......... G05D 1/0265

* cited by examiner

CHARGING MODULE AND ROBOT HAVING THE SAME

CROSS REFERENCE TO RELATED APPLICATIONS

This application claims priority to Chinese Patent Application No. 201911116936.X, filed Nov. 15, 2019, which is hereby incorporated by reference herein as if set forth in its entirety.

BACKGROUND

1. Technical Field

The present disclosure generally relates to robots, and particularly to a charging module and a robot including the charging module.

2. Description of Related Art

Most mobile robots (such as autonomous robots) are powered by batteries, and usually come with charging docks and can charge themselves. Due to many factors, such as navigation errors and dimension errors after repeated use, there may exist one problem that the mobile robots cannot align themselves with the charging docks well and thus have difficulty charging themselves. Therefore, it is desirable and useful to provide a charging system to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
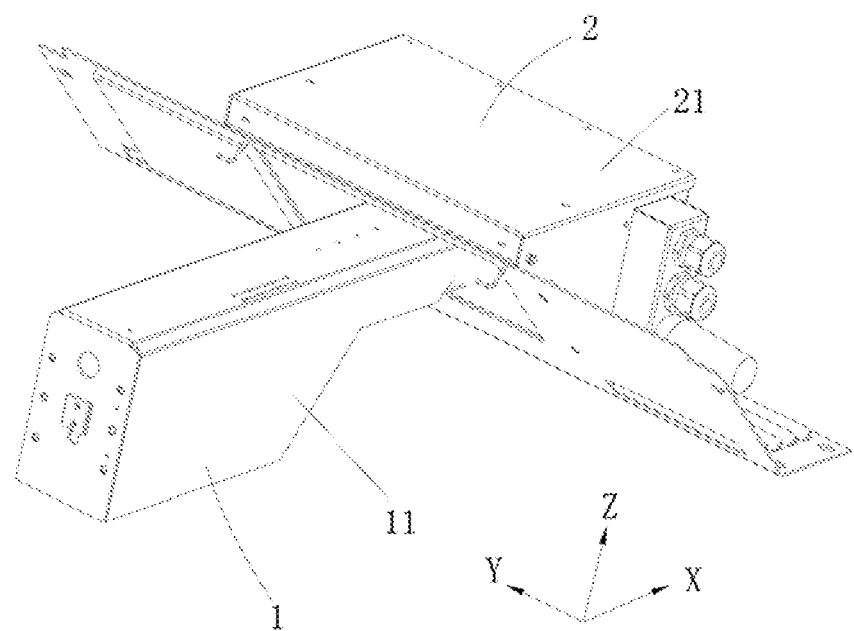
FIG. 1 is an isometric view of a charging station and a charging module according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
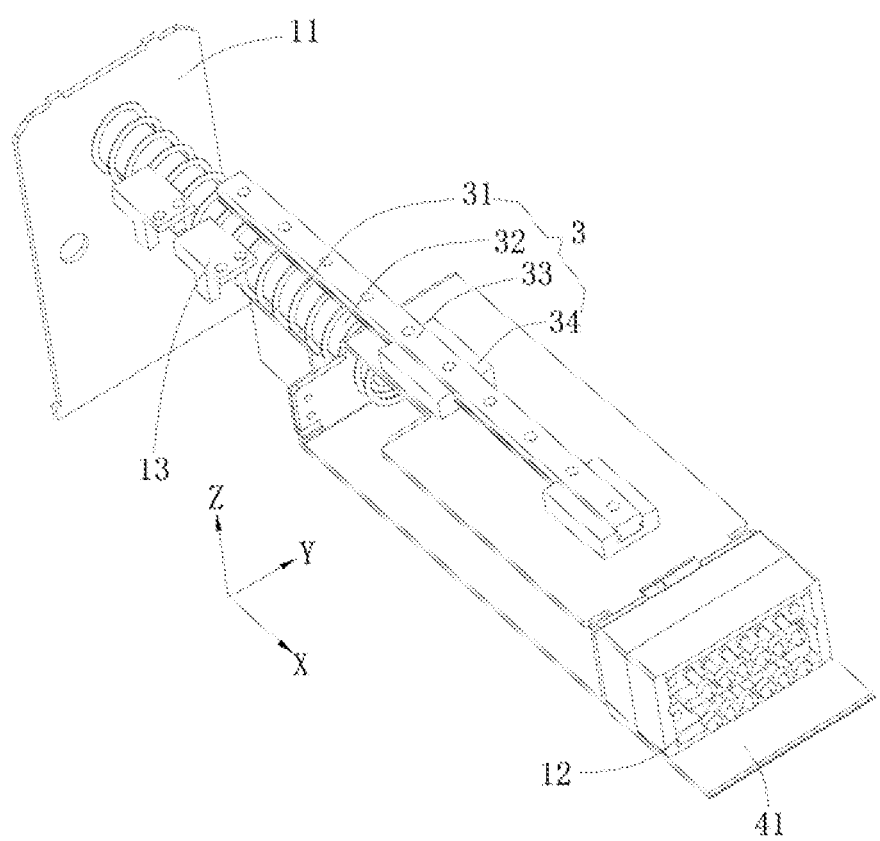
FIG. 2 is an isometric view of the charging station of FIG. 1.

Referring to FIGS. 1 and 2, in one embodiment, a charging station 1 for use with a charging module 2 includes a casing 11, a first connector 12 and a guide structure. The guide structure is configured to guide the first connector 12 in a vertical direction during the engagement process of a second connector 23 of the charging module 2 with the first connector 12, such, that the second connector 23 can move in the vertical direction and finally align with and mated with the first connector 12. In one embodiment, the guide structure is a guiding member 41 fixed to the first connector 12, and a counterpart guiding mechanism 42 is arranged in the charging module 2. The guiding member 41 is configured to engage with the guiding mechanism 42 so as to move the second connector 23 in the vertical direction and align the second connector 23 with the first connector 12. In another embodiment, the guiding member 41 may be arranged in the charging module 2, and the guiding mechanism 42 may be arranged in the charging station 1. In this embodiment, the guiding member 41 can still be engaged with the guiding mechanism 42 so as to move the first connector 12 in the vertical direction and align the first connector 23 with the second connector 23. It should be noted that FIGS. 1 and 2 show only an example of the charging station 1 and charging module 2, and they may have more components than shown.

In one embodiment, the charging station 1 further includes an elastic mechanism 3 elastically connects the first connector 12 to the casing 11 and is configured to push the first connector 12 to tightly abut against the second connector 23. With such arrangement, the first connector 12 can be pushed to move backward during an attempt of the second connector 23 to be engaged with the first connector 12 until they are fully mated with each other. In one embodiment when the guiding member 41 is arranged in the charging module 2, and the guiding mechanism 42 is arranged in the charging station 1, the elastic mechanism 3 may be arranged in the charging module 2, and elastically connects the second connector 23 to a housing of the charging module 2. With such arrangement, the second connector 23 can be pushed to move backward during an attempt of the second connector 23 to be engaged with the first connector 12 until they are fully mated with each other.

Figure 3:
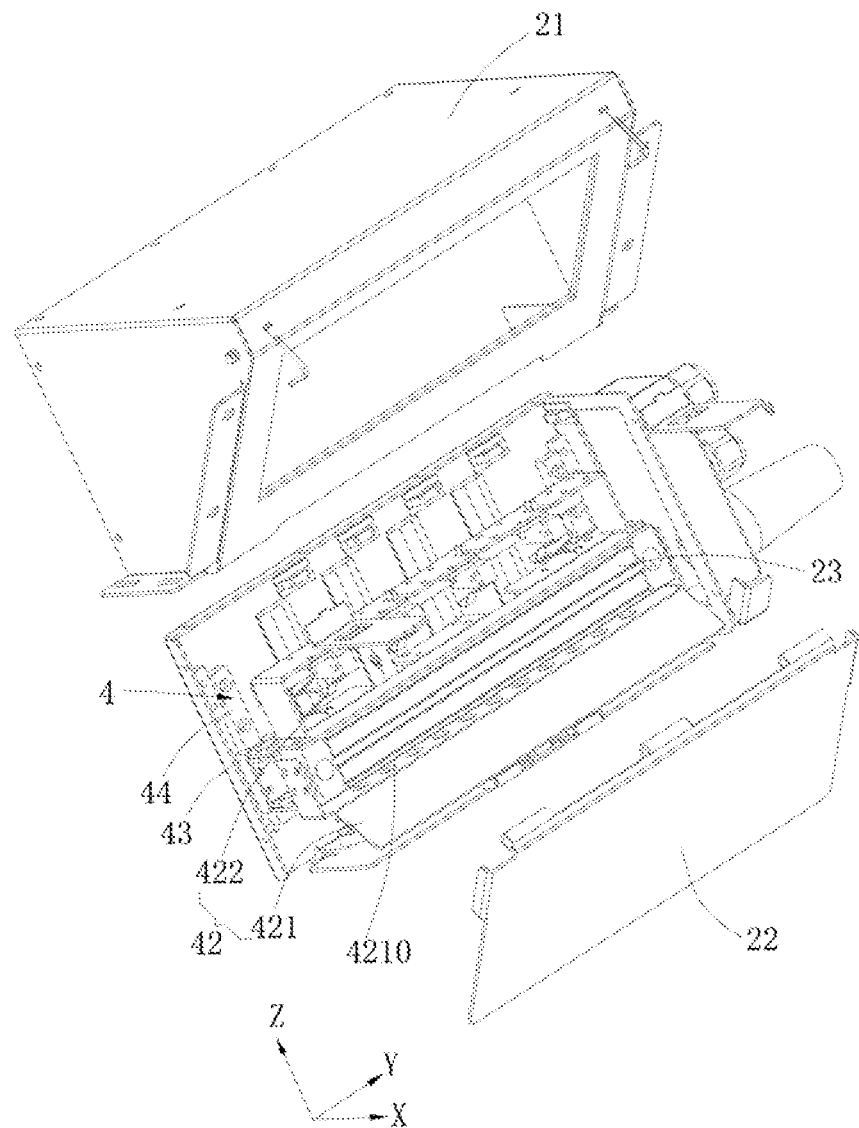
FIG. 3 is an isometric exploded view of the charging module of FIG. 1.

Referring to FIG. 3, in one embodiment, the charging module 2 may be arranged in a mobile robot and includes a housing 21, the second connector 23 and a guide structure. The guide structure is configured to guide the second connector 23 in a vertical direction during the engagement process of a second connector 23 with the first connector 12, such that the second connector 23 can move in the vertical direction and finally align with and mated with the first connector 12. In one embodiment, the guide structure is a guiding mechanism 42 that elastically connects the second connector 23 to the housing 21 and allows the second connector 23 to move with respect to the housing 21 in the vertical direction. The guiding member 41 can be engaged with the guiding mechanism 42 so as to move the second connector 23 in the vertical direction and align the second connector 23 with the first connector 12.

In one embodiment, the guiding member 41 may be arranged in the charging module 2, and the guiding mechanism 42 may be arranged in the charging station 1. In the embodiment, the guiding member 41 can still be engaged with the guiding mechanism 42 so as to move the first connector 12 in the vertical direction and align the first connector 23 with the second connector 23. In the embodiment, the charging module 2 may further includes an elastic mechanism elastically connects the second connector 23 to the housing 21 and is configured to push the second connector 23 to tightly abut at the first connector 12. With such arrangement, the second connector 23 can be pushed to move backward during an attempt of the second connector 23 to be engaged with the first connector 12 until they are fully mated with each other.

In one embodiment, as charging system includes the charging station 1, the charging module 2, the elastic mechanism 3, and the guide structure. The charging station 1 may be located at a fixed location, and the charging module 2 may be arranged in a mobile robot. When the mobile robot needs to be charged, it can move to the charging module 2. As described above, the elastic mechanism 3 may be arranged in one of the charging station 1 and the charging module 2. The guide structure includes the guiding mechanism 42 and the guiding member 41. As described above, one of the guiding mechanism 42 and the guiding member 41 may be connected to the first connector 12, and the other may be connected to the second connector 23.

With such configuration, the second connector 23 can move in the vertical direction during engagement with the first connector 12. As a result, the second connector 23 can be fully engaged with the first connector 12 even if there exists navigation errors and dimension errors in the vertical direction, which allows the robot to be charged without difficulty.

As shown in FIG. 2, in one embodiment, the elastic mechanism 3 includes a first elastic member 31, a slide rail 33 and a first slider 34 that is slidable on the slide rail 33.

In one embodiment, the elastic mechanism 3 further includes a post 32, and the first elastic member 31 is a coil spring arranged around the post 32. The post 32 provides a support to the first elastic member 31 and prevents it from being bent when the first elastic member 31 is compressed.

As shown in FIG. 2, in one embodiment, the first elastic member 31 is arranged in the charging station 1. Opposite ends of the first elastic member 31 are fixed to the casing 11 and the first connector 12. The first slider 34 is fixed to the first connector 12, and the first rail 33 is fixed to the casing 11. During the engagement process of the second connector 23 with the first connector 12, the first connector 12 is pushed by the second connector 23 to move together with the first slider 34 along the first rail 33, and the first elastic member 21 is compressed. After the second connector 23 stops moving, the first connector 12 abuts tightly against the second connector 23, which creates a reliable electrical connection between the first connector 12 and the second connector 23. The engagement of the first slider 34 and the first rail 33 can make the movement of the first connector 12 more stable, and prevent the first connector 12 from shaking during movement. The number of sliding components formed by the first slider 34 and the first rail 33 may be selected according to actual need.

In one embodiment, one end of the post 32 is fixed to the casing 11, and one end of the first elastic member 31 abuts against the casing 11. The first slider 34 compresses the first elastic member 31 when it moves.

In one embodiment, the charging station 1 further includes a limit switch 13 that is configured to output a signal when the first connector 12 has moved to a determined limit position. In one embodiment, the limit switch 13 is a mechanical switch and when the limit switch 13 comes into contact with the first slider 34, the charging station 1 may output an audio warning upon receipt of a signal from the limit switch 13. The charging module 2 may stops moving upon receipt of a signal from the charging station 1. With such arrangement, the first connector 12 will not move beyond its limit position, preventing the charging station 1 and the charging module 2 from being damaged.

In one embodiment, the first elastic member 31 may be arranged in the charging module 2. Opposite ends of the first elastic member 31 may be fixed to the housing 21 and the second connector 23. The first slider 34 is fixed to the second connector 23, and the first rail 33 is fixed to the housing 21. During the engagement process of the second connector 23 with the first connector 12, the second connector 23 is pushed by the first connector 12 to move together with the first slider 34 along the first rail 33, and the first elastic member 21 is compressed. After the second connector 23 stops moving, the first connector 12 abuts tightly against the second connector 23, which creates a reliable electrical connection between the first connector 12 and the second connector 23. The engagement of the first slider 34 and the first rail 33 can make the movement of the second connector 23 more stable, and prevent the second connector 23 from shaking during movement. The number of sliding components formed by the first slider 34 and the first rail 33 may be selected according to actual need.

In one embodiment, one end of the post 32 may be fixed to the housing 21, and one end of the first elastic member 31 abuts against the housing 21. The first slider 34 compresses the first elastic member 31 when it moves.

In one embodiment, the charging module 2 may further include a limit switch that is configured to output a signal when the second connector 23 has moved to a determined limit position. In one embodiment, the limit switch is a mechanical switch and when the limit switch comes into contact with the first slider 34, the charging module 2 may output an audio/visual warning upon receipt of a signal from the limit switch. The charging module 2 may stops moving upon receipt of a signal from the limit switch. With such arrangement, the second connector 12 will not move beyond its limit position, preventing the charging station 1 and the charging module 2 from being damaged.

Figure 4:
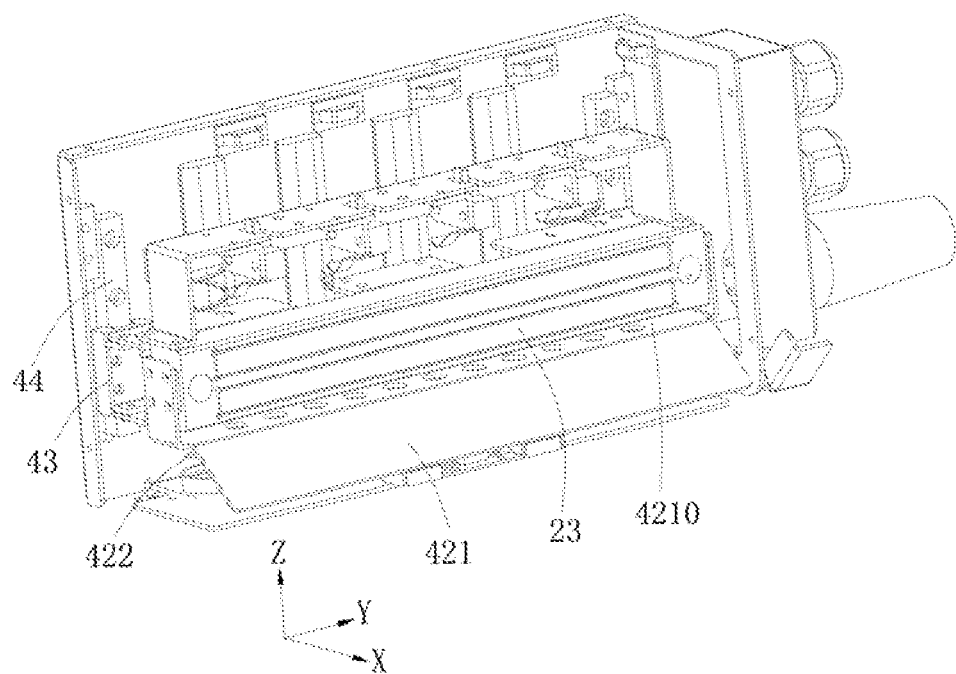
FIG. 4 is an isometric view of the charging module of FIG. 1.
Figure 5:
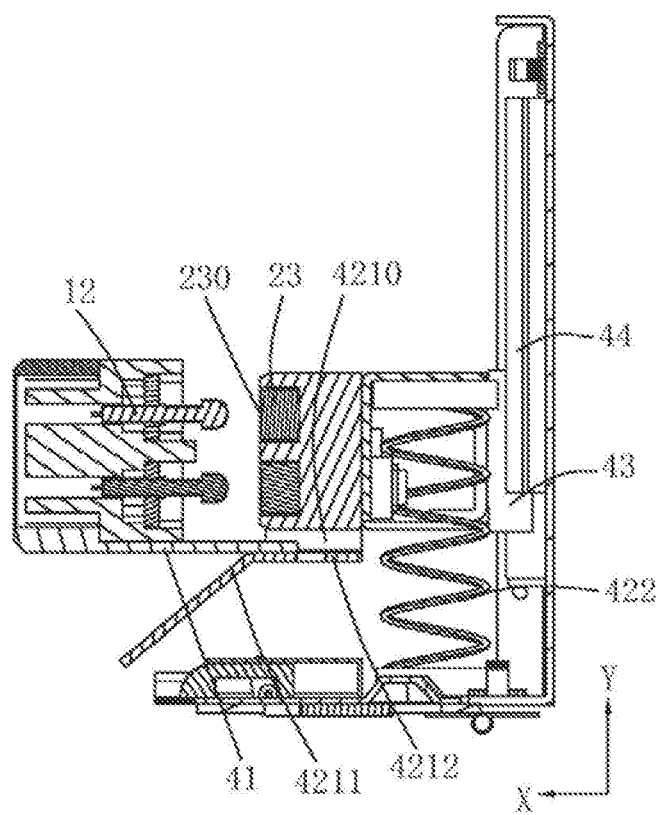
FIG. 5 is a planar cross-sectional view of the charging station and the charging module of FIG. 1.

Referring to FIGS. 3-5, in one embodiment, the guiding mechanism 42 includes a guiding plate 421 and a second elastic member 422. The guiding plate 421 includes a tilted plate 4211 and a connection plate 4212 that are connected to each other. The connection plate 4212 is substantially horizontal. In one embodiment, the guiding plate 421 is fixed to the second connector 23, and opposite ends of the second elastic member 422 are fixed to the second connector 23 and the housing 21. During the engagement process of the second connector 23 with the first connector 12, the end of the guiding member 41 can come into contact with and slide on the tilted plate 4211. The guiding member 41 then pushes the guiding plate 421 which in turn drives the second connector 23 to move downward. Once the end of the guiding member 41 moves from the tilted plate 4211 to the connection plate 4212, the second connector 23 stops moving downward, and the second connector 23 is now aligned with the first connector 12. After the guiding member 41 has disengages from the guiding plate 421, the second elastic member 422 returns the second connector 23 to its original position.

Referring to FIGS. 3-5, in one embodiment, the guiding member 41 is substantially horizontal. The second elastic member 422 is a coil spring. During the downward movement of the second connector 23, the second elastic member 422 is compressed. After the guiding member 41 has disengages from the guiding plate 421, the second elastic member 422 rebounds and pushes the second connector 23 to move up to its original position. In one embodiment, the tilted plate 4211 has an inclination angle of 45 degrees with respect to a horizontal imaginary plane. However, the inclination angle can change according to actual need.

In one embodiment, the charging module 2 further includes a lid 22 rotatably connected to the housing 21. The lid 22 protects the second connector 23 from being exposed to the outside environment. The lid 22 can be pushed by the charging module 2 to rotate inward such that the second connector 23 can be engaged with the first connector 12.

In one embodiment, a receiving, space 4210 is formed between the connection plate 4212 of guiding plate 421 and the second connector 23, and configured to receive a portion of the guiding member 41. After the end portion of the guiding member 41 is received in the receiving space 4210, the guiding member 41 abuts tightly against the connection plate 4212, which allows the second connector 23 to align with the first connector 12 in the vertical direction. In another embodiment, the connection plate 4212 may be modified to defined solely the receiving space 4210.

In one embodiment, the charging module 2 further includes a second slider 43 and a second rail 44. The second connector 23 is fixed to the second slider 43, and the second rail 44 is fixed to the housing 21. The second slider 43 is connected to and slidable on the second rail 44. With such configuration, the second connector 23 can move steadily in the vertical direction. The number of sliding components formed by the second slider 43 and the second rail 44 may be selected according to actual need.

In one embodiment, the guiding member 41 may be connected to the second connector 23, and the guiding mechanism 42 may be connected to the first connector 12. In the embodiment, the guiding plate 421 may be fixed to the first connector 12. Opposite ends of the second elastic member 422 are fixed to the first connector 12 and the casing 11. During the engagement process of the second connector 23 with the first connector 12, the end of the guiding member 41 can come into contact with and slide on the tilted plate 4211. The guiding member 41 then pushes the guiding plate 421 which in turn drives the first connector 12 to move downward. Once the end of the guiding member 41 moves from the tilted plate 4211 to the connection plate 4212, the first connector 12 stops moving downward, and the second connector 23 is now aligned with the first connector 12. After the guiding member 41 has disengages from the guiding plate 421, the second elastic member 422 returns the first connector 12 to its original position.

In one embodiment, a receiving space may be formed between the connection plate 4212 of guiding plate 421 and the first connector 12, and configured to receive a portion of the guiding member 41. After the end portion of the guiding member 41 is received in the receiving space 4210, the guiding member 41 abuts tightly against the connection plate 4212, which allows the second connector 23 to align with the first connector 12 in the vertical direction. In another embodiment, the connection plate 4212 may be modified to defined solely the receiving space 4210.

In one embodiment, the first connector 12 may be fixed to the second slider 43, and the second rail 44 may be fixed to the casing 11. The second slider 43 is connected to and slidable on the second rail 44. With such configuration, the first connector 12 can move steadily in the vertical direction. The number of sliding components formed by the second slider 43 and the second rail 41 may be selected according to actual need.

Referring to FIGS. 2 and 4, in one embodiment, the first connector 12 has a length smaller than a length of the second connector 23. The difference between the length of the first connector 12 and the second connector 23 are selected in such a way that the first connector 12 can always be engaged with the second connector even if there exists navigation errors and dimension errors. In another embodiment, the first connector 12 may have a length greater than a length of the second connector 23.

Referring to FIGS. 2 and 4, in one embodiment, the first connector 12 includes a number of spring-loaded pins, and the second connector 23 includes a conductive pad that is configured to be engaged with the spring-loaded pins. The conductive pad has a curved, recessed surface that is configured to be in contact with the spring-loaded pins. The recessed surface can avoid that the spring-loaded pins at opposite ends of the first connector 12 cannot make contact with the conductive pad. In another embodiment, the conductive pad may include an outwardly curved surface that is configured to be engaged with the spring-loaded pins.

Figure 6:
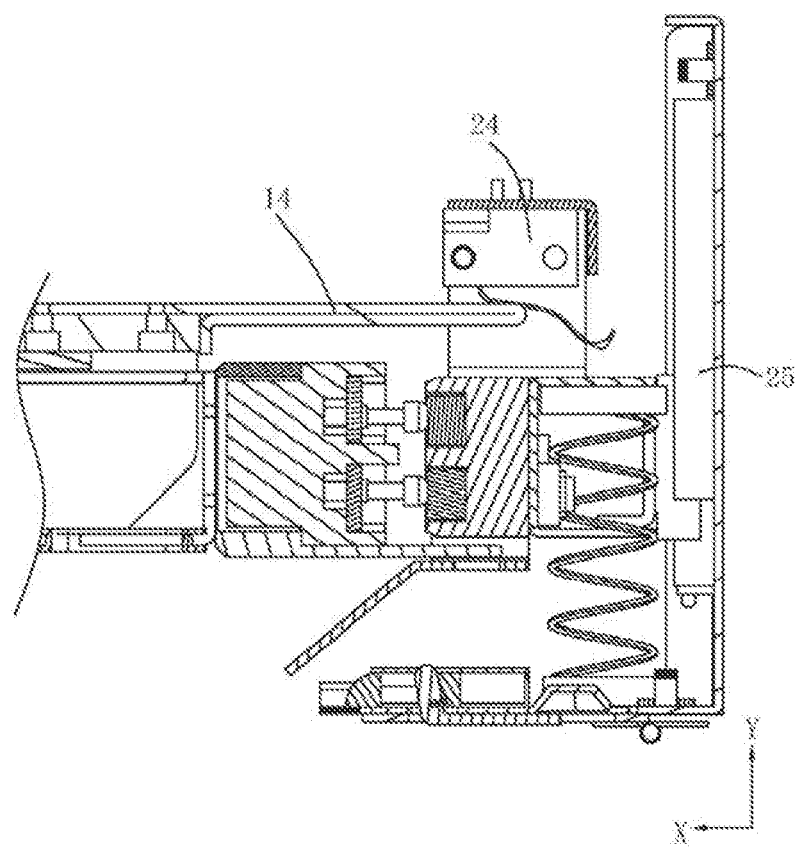
FIG. 6 is a planar cross-sectional view of a charging station and a charging module according to one embodiment.

Referring to FIG. 6, in one embodiment, the charging module 2 may include a limit switch 24 arranged above the second connector 23, and the charging station 1 includes an actuation member 14 arranged above the first connector 12. Alter the second connector 23 has been engaged with the first connector 12, the end of the actuation member 14 will come into contact with the limit switch 24 which outputs a signal. The robot including the charging module 2 then stops moving upon receipt of the signal from the limit switch 24. The charging module 2 may include a bumper 25 attached to the housing 21. The bumper 25 may be made of rubber and will come into contact with the end of the actuation member 14 in an abnormal condition when the robot does not stop moving upon receipt of the signal from the limit switch 24. Further movement of the robot is stopped by the bumper 25 being in contact with the actuation member 14, which presents the charging station and the robot from being damaged.

Figure 7:
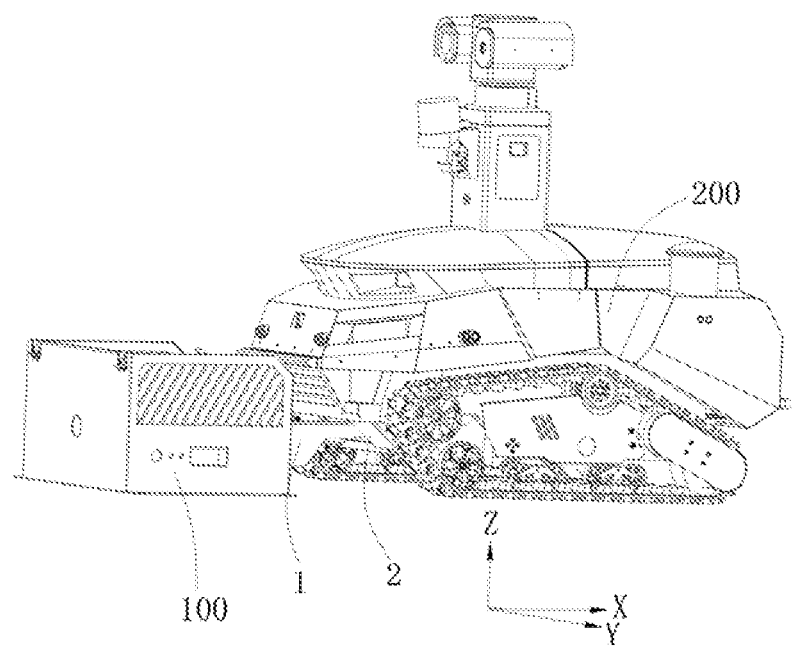
FIG. 7 is an isometric view of a dock device and a robot according to one embodiment.

Referring to FIG. 7, in one embodiment, a robot 200 includes the charging module 2 and can be charged by a dock device 100 including the charging station 1 when the first connector 12 and the second connector 23 are engaged with each other.

Although the features and elements of the present disclosure are described as embodiments in particular combinations, each feature or element can be used alone or in other various combinations within the principles of the present disclosure to the full extent indicated by the broad general meaning, of the terms in which the appended claims are expressed.

What is claimed is:

1. A charging module for use with a charging station that comprises a first connector, the charging module comprising:
   a housing;
   a second connector; and
   a guide structure configured to guide the first connector in a vertical direction, wherein the guide structure comprises a guiding member fixed to the second connector, or a guiding mechanism that elastically connects the second connector to the housing and allows the second connector to move with respect to the housing in the vertical direction; and an elastic mechanism elastically connects the second connector to the housing and is configured to push the second connector to tightly abut against the first connector;

wherein the elastic mechanism comprises a first elastic member, a slide rail and a first slider that is slidable on the slide rail, opposite ends of the first elastic member are fixed to the housing and the second connector, the first slider is fixed to the second connector, and the first rail is fixed to the housing.

2. A charging system comprising:

a charging station comprising a casing and a first connector;

a mobile charging module comprising a housing and a second connector, wherein one of the charging station and the charging module comprises an elastic mechanism that is configured to push the second connector to tightly abut against the first connector; and a guide structure comprising a guiding mechanism and a guiding member that is configured to guide the guiding mechanism in a vertical direction, one of the guiding mechanism and a guiding member is connected to the first connector, and the other one of the guiding mechanism and a guiding member is connected to the second connector;

wherein the elastic mechanism comprises a first elastic member, a slide rail and a first slider that is slidable on the slide rail, opposite ends of the first elastic member are fixed to the casing and the first connector, the first slider is fixed to the first connector, and the first rail is fixed to the casing.

3. The charging system according to claim 2, wherein the elastic mechanism further comprises a post, the first elastic member is a coil spring arranged around the post.

4. The charging system according, to claim 2, wherein the guiding mechanism comprises a guiding plate and a second elastic member, the guiding member is connected to the first connector, the second connector is fixed to the guiding plate, and opposite ends of the second elastic member are connected to the second connector and the housing.

5. The charging system according to claim 4, wherein a receiving space is formed between the guiding plate and the second connector, and configured to receive a portion of the guiding member.

6. The charging system according to claim 4, further comprising a second slider and a second rail, wherein the second connector is fixed to the second slider, the second rail is fixed to the housing, and the second slider is connected to and slidable on the second rail.

7. The charging system according to claim 2, wherein the charging station comprises the elastic mechanism and a limit switch that is configured to output a signal when the first connector has moved to a determined limit position.

8. The charging system according to claim 2, wherein the first connector has a length smaller than a length of the second connector.

9. The charging system according to claim 2, wherein the first connector comprises a plurality of spring-loaded pins, and the second connector comprises a conductive pad that is configured to be engaged with the spring-loaded pins.

10. The charging system according to claim 2, wherein the charging module comprises a limit switch, the charging station comprises an actuation member, the limit switch is configured to output a signal when the actuation member comes into contact with the limit switch.

11. The charging system according to claim 10, wherein the charging module comprises a bumper that is configured to come into contact with the actuation member to stop movement of the charging module.

12. A robot comprising, a charging module for use with a charging station that comprises a first connector, the charging module comprising:

a housing;

a second connector; and a guide structure configured to guide the first connector in a vertical direction, wherein the guide structure comprises a guiding member fixed to the second connector, or a guiding mechanism that elastically connects the second connector to the housing and allows the second connector to move with respect to the housing in the vertical direction; and an elastic mechanism elastically connects the second connector to the housing and is configured to push the second connector to tightly abut against the first connector;

wherein the elastic mechanism comprises a first elastic member, a slide rail and a first slider that is slidable on the slide rail, opposite ends of the first elastic member are fixed to the housing and the second connector, the first slider is fixed to the second connector, and the first rail is fixed to the housing.

13. The robot according to claim 12, wherein the elastic mechanism further comprises a post, the first elastic member is a coil spring arranged around the post.

14. The robot according to claim 12, wherein the charging module comprises a limit switch, the charging station comprises an actuation member, the limit switch is configured to output a signal when the actuation member comes into contact with the limit switch.

15. The robot according to claim 14, wherein the charging module comprises a bumper that is configured to come into contact with the actuation member to stop movement of the charging module.

* * * * *